United States Patent [19]

Mehta

[11] 3,959,593

[45] May 25, 1976

[54] TRAFFIC ANALYSIS FROM A SCANNER USING A MICRO-PROCESSOR

[75] Inventor: Madhukumar A. Mehta, Melrose Park, Ill.

[73] Assignee: GTE Automatic Electric Laboratories Incorporated, Northlake, Ill.

[22] Filed: Apr. 25, 1973

[21] Appl. No.: 354,289

[52] U.S. Cl................................. 179/8 A
[51] Int. Cl.² ........................................ H04M 3/24
[58] Field of Search.............. 179/8 A, 18 J, 15 A; 340/172.5

[56] References Cited
UNITED STATES PATENTS

| 3,761,618 | 9/1973 | Alston............................... 179/8 A |
| 3,825,905 | 2/1974 | Allen ............................... 340/172.5 |

FOREIGN PATENTS OR APPLICATIONS

| 1,213,895 | 4/1966 | Germany........................... 179/8 A |

OTHER PUBLICATIONS

*Telephony*, Vol. 184, No. 23; "A Computerized System for Improved Data Collection," by Paul C. Dinger; pp. 37–40.

*Primary Examiner*—David L. Stewart
*Attorney, Agent, or Firm*—David W. Heid

[57] ABSTRACT

A traffic analysis system is disclosed which utilizes a scanner to provide the identity of the trunk group within which a call attempt has occurred. The trunk group identity information from the scanner is supplied to a multiplexer which makes available four, 8-bit words based on the trunk identity information from the scanner. A micro-processor is coupled to the multiplexer and upon the occurrence of a call attempt the micro-processor adds the four words from the multiplexer, the sum of these words yielding the address of the proper storage location in a memory unit for storing the call attempt indication.

7 Claims, 8 Drawing Figures

|       | $D_7$ | $D_6$ | $D_5$ | $D_4$ | $D_3$ | $D_2$ | $D_1$ | $D_0$ |
|-------|-------|-------|-------|-------|-------|-------|-------|-------|
| AD+0  | AT    | OVF   | 0     | 0     | $U'_8$ | $U'_4$ | $U'_2$ | $U'_1$ |
| AD+1  | 0     | $T_7$ | $T_4$ | $T_2$ | $T_1$ | $T_2$ | $T_1$ | 0 |
| AD+2  | $H_2$ | $H_1$ | $H_1$ | 0     | $T_4$ | $T_7$ | $T_7$ | 0 |
| AD+3  | 0     | $H_2$ | 0     | 0     | $H_2$ | $H_1$ | 0     | 0 |

| DIGIT | 7-4-2-1-0 REPRESENTATION ||||| WEIGHTED 7-4-2-1 REPRESENTATION |||| WEIGHTED 8-4-2-1 REPRESENTATION ||||
|---|---|---|---|---|---|---|---|---|---|---|---|---|---|
|   | 7 | 4 | 2 | 1 | 0 | 7 | 4 | 2 | 1 | 8 | 4 | 2 | 1 |
| 0 | 1 | 1 | 0 | 0 | 0 | 0 | 0 | 0 | 0 | 0 | 0 | 0 | 0 |
| 1 | 0 | 0 | 0 | 1 | 1 | 0 | 0 | 0 | 1 | 0 | 0 | 0 | 1 |
| 2 | 0 | 0 | 1 | 0 | 1 | 0 | 0 | 1 | 0 | 0 | 0 | 1 | 0 |
| 3 | 0 | 0 | 1 | 1 | 0 | 0 | 0 | 1 | 1 | 0 | 0 | 1 | 1 |
| 4 | 0 | 1 | 0 | 0 | 1 | 0 | 1 | 0 | 0 | 0 | 1 | 0 | 0 |
| 5 | 0 | 1 | 0 | 1 | 0 | 0 | 1 | 0 | 1 | 0 | 1 | 0 | 1 |
| 6 | 0 | 1 | 1 | 0 | 0 | 0 | 1 | 1 | 0 | 0 | 1 | 1 | 0 |
| 7 | 1 | 0 | 0 | 0 | 1 | 1 | 0 | 0 | 0 | 0 | 1 | 1 | 1 |
| 8 | 1 | 0 | 0 | 1 | 0 | 1 | 0 | 0 | 1 | 1 | 0 | 0 | 0 |
| 9 | 1 | 0 | 1 | 0 | 0 | 1 | 0 | 1 | 0 | 1 | 0 | 0 | 1 |

TRAFFIC ANALYSIS FROM A SCANNER USING A MICRO-PROCESSOR

BACKGROUND OF THE INVENTION

This invention relates generally to the field of telephone communications and more particularly to a system for recording trunk usage on a plurality of trunk groups. This trunk usage information is recorded to provide a record of the attempts and overflow, for instance, on the trunks within each group so that traffic load on trunk groups may be equalized.

SUMMARY OF THE INVENTION

In the present invention a trunk usage recording system is disclosed which utilizes the unique advantages found in microprocessors presently available. In the present invention the trunk usage information is picked up by a scanner and transmitted to a multiplexer. A memory unit, and a micro-processor are interconnected with the multiplexer. The memory unit supplies instructions for operating the system and contains storage spaces for retaining the trunk usage information. The memory unit instructs the micro-processor to periodically read the first word from the multiplexer and if this first word, which is produced by information obtained from the scanner, indicates that a call attempt has occurred, then the micro-processor addresses the multiplexer to send out to the micro-processor the remaining words of a group of words. Each of the words from the multiplexer are added together in the micro-processor and the results yields an address of the memory location where the corresponding attempt meter is stored. The content of the memory location at this address is then incremented by the micro-processor.

In the present invention the system provides recording capability for up to 200 trunk groups. By utilizing the unique characteristic of the micro-processor in being able to process words very effectively, it is possible to provide a relatively simple and fast system in which the multiplexer is required to supply only a few 8-bit words to the micro-processor in order to increment any of the two hundred trunk group meters in the memory.

DESCRIPTION OF THE PREFERRED EMBODIMENT

Figure 1:
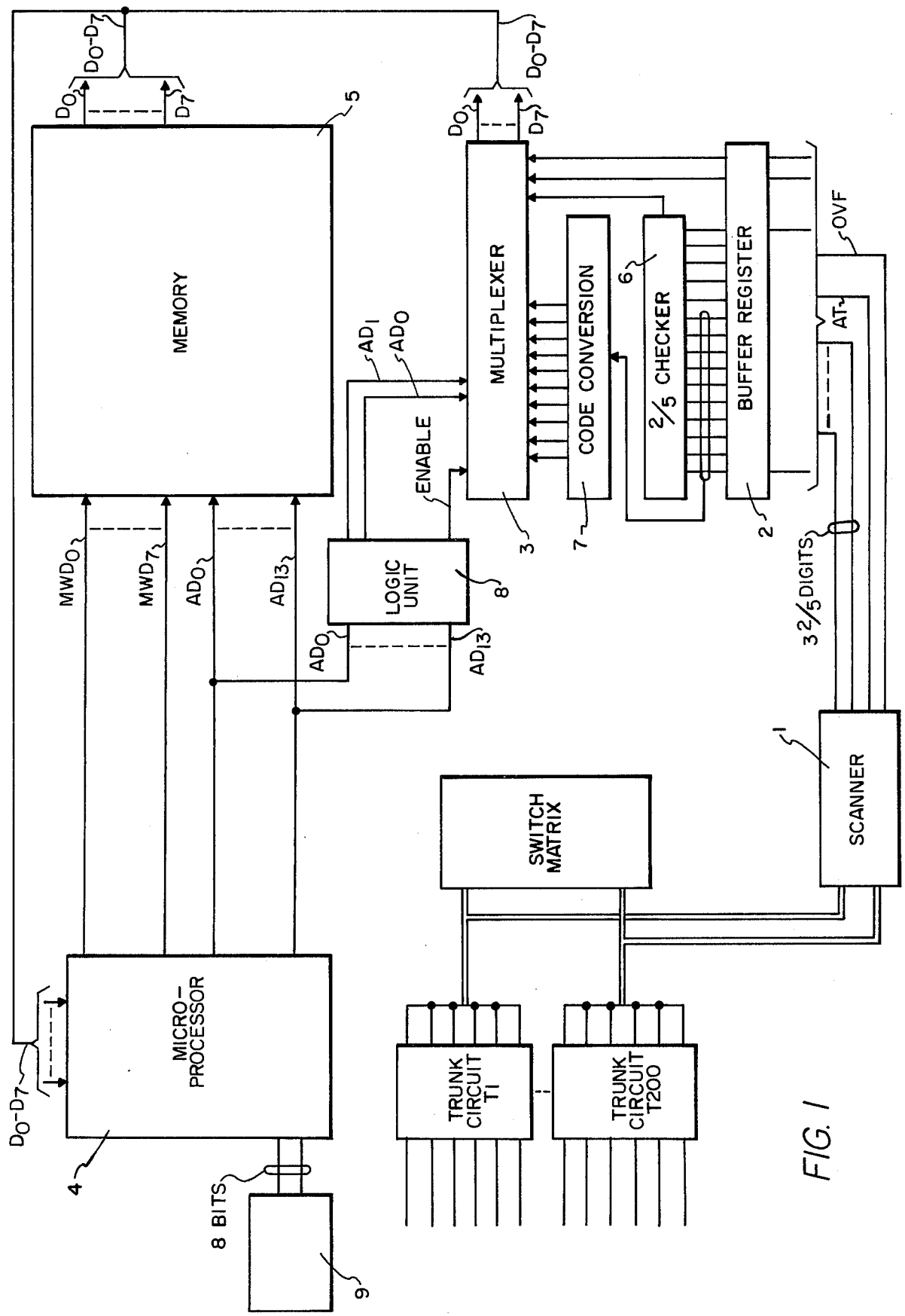
FIG. 1 is a block diagram of a trunk usage recording system of the present invention.

FIG. 1 is a block diagram of the traffic analysis system of the present invention used to store the number of attempts and overflow conditions which occur on the trunks of a trunk group. In this embodiment, 200 groups of trunks may be analyzed by the system, however one skilled in the art will appreciate that the system may be expanded or reduced to analyze various numbers of trunk groups. As can be seen in FIG. 1, scanner 1 is coupled to trunk circuits T1 to T200 and provides the trunk group identity, by a group of three, 2-out-of-5 bit digits, and the attempt and overflow information to buffer register 2 for each of the two hundred trunk groups. Scanner 1 may be of the type described in U.S. Pat. No. 3,413,421 issued on Nov. 26, 1968 to A. S. Cochran et al. The output from the scanner of the Cochran patent is a 4 bit word, however it is deemed to be within the ordinary skill of the designer to provide the trunk identification in a 2-out-of-5 bit code as is used in the present invention as opposed to the 4 bit code of the Cochran scanner arrangement. In view of the Cochran patent, which clearly describes the operation of the scanner, explanation of this scanner is not here deemed necessary. The trunk group identity in the 2-out-of-5 bit code and the attempt and overflow indications are supplied to buffer register 2. The attempt and overflow indications are supplied to the multiplexer 3 through buffer register 2, since only if there is an input of either an attempt or overflow will multiplexer 3 supply an output to the micro-processor 4. If there is no attempt or overflow for the trunk group scanned at the particular time, it is unnecessary for micro-processor 4 to perform its function in incrementing the trunk group location into the memory 5. For the purpose of explaining the operation of the traffic analysis system, it will be assumed that the input identity to buffer register 2 was accompanied by an attempt to the trunk group being scanned. Buffer register 2 receives the trunk group identity in the three, 2-out-of-5 bit indications and from buffer register 2 the trunk group identity is transferred to a 2-out-of-5 bit checker 6 which verifies that each of the three groups does in fact include not more or less than 2 bits. If any of the digit groups fail the test by 2-out-of-5 checker 6, then the output of checker 6 will be all zero's, that is the trunk group address will be all zeros rather than a number from 1 to 200 which is the normal indication since the scanning is done on two hundred trunk groups. The output from buffer register 2 is also fed to code conversion unit 7 which converts the three groups of 2-out-of-5 bit code into a code which is readily acceptable by multiplexer 3 and which allows a reduction in the number of addresses required for multiplexer 3. A detailed operational description of code conversion unit 7 will be presented subsequently.

The trunk group identification information from code conversion unit 7 is supplied to multiplexer 3 and is available for supply to micro-processor 4 upon request. Logic unit 8 interprets the fourteen lines of address which it receives from micro-processor 4 and through an enable bus and two address buses, logic unit 8 addresses multiplexer 3 to send out the requested information to micro-processor 4. The requested information which will be sent to micro-processor 4 for various addresses is illustrated in FIG. 6.

Figure 4:
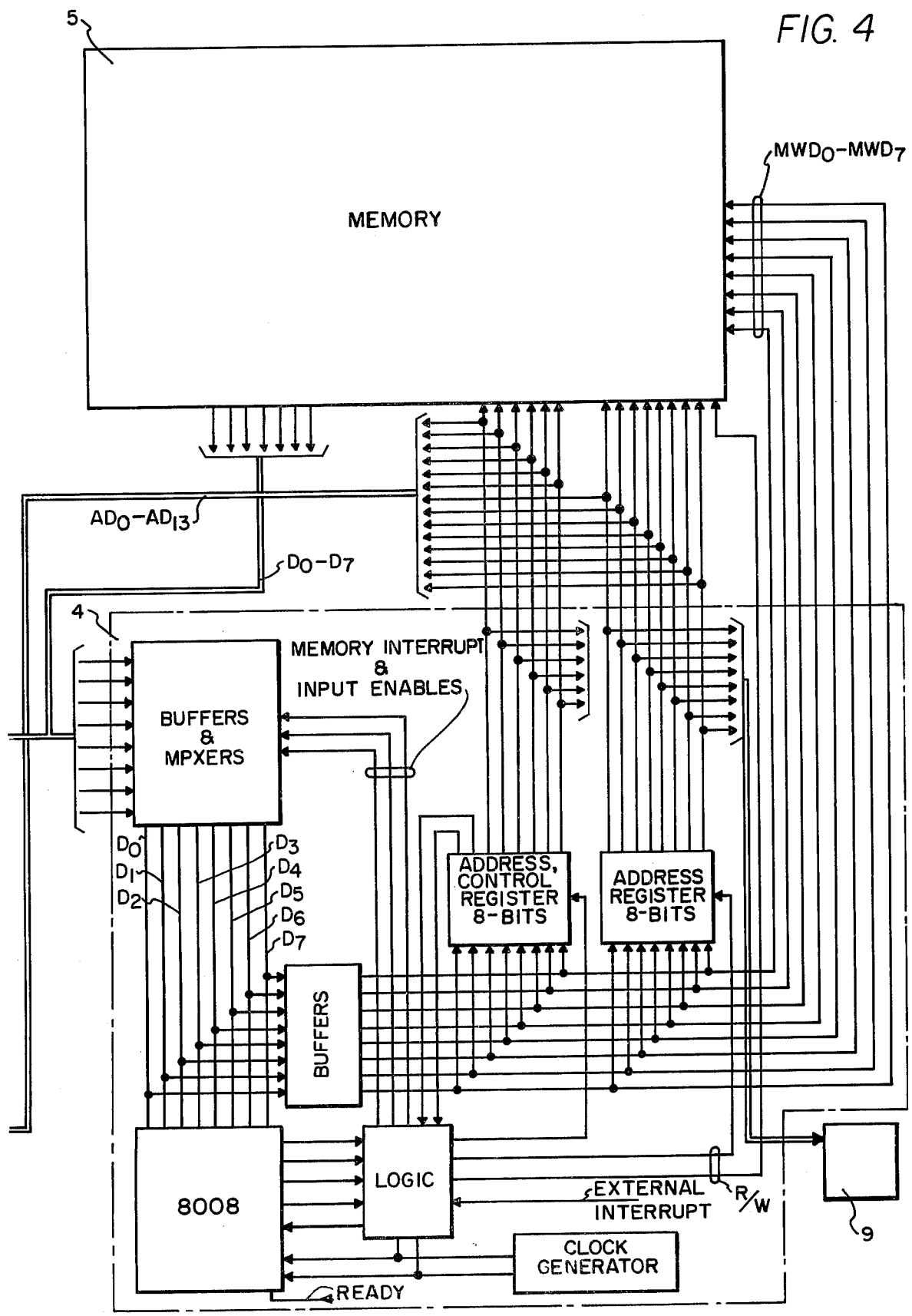

Micro-processor 4, which is illustrated in detail in FIG. 4, uses an INTEL 8008, 8-bit parallel central processor unit. The 8008 central processor unit is manufactured by the INTEL Corporation of 3065 Bowers Ave., Santa Clara, Calif. The 8008 is an eight bit parallel central processor unit on a single MOS integrated circuit chip and may be interfaced with memories having capacities up to 16K bytes. It has 48 data oriented instructions, and complete instruction decoding and control in addition to seven, 8-bit general purpose registers and an address stack having eight 14-bit registers. By comparison with present day computers, the 8008 processor is relatively slow having an instruction cycle time of a minimum of 20 microseconds.

Micro-processor 4 includes its own clock source and peripheral circuitry to communicate with the outside world. In the present system configuration, micro-processor 4 can talk to teletypewriter 9, or other similar printout device, and memory 5. Communication to memory 5 is by a fourteen-bit address bus providing the address of the memory location. Micro-processor 4 sees the multiplexer 3 as though it is an additional memory consisting of four words. Memory 5 contains the program information for operation of the system, and also provides storage counters for attempt and overflow information.

Figures 6, 7, 8:
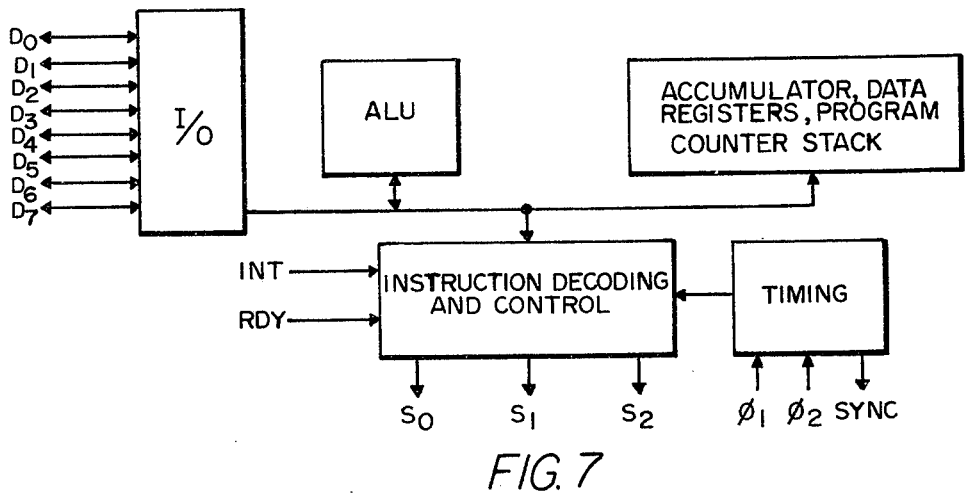
FIG. 6 illustrates the four 8-bit words which the multiplexer will present to the micro-processor for the addresses AD+0, AD+1, AD+2 and AD+3.
FIG. 7 is a block diagram representation of the internal circuitry of the micro-processor employed in the present invention.
FIG. 8 is a chart illustrating the relationship between the 7-4-2-1-0 representation, the weighted 7-4-2-1 representation and the weighted 8-4-2-1 representation for the digits 0 through 9.

FIG. 7 is a block diagram representation of the internal circuitry of the 8008 central processor unit. The details of the operation of the 8008 central processor unit are found in the operator's manual published by the INTEL Corporation and are readily available therefrom, hence a description of the operation will not be attempted here. The system provides a periodic output to teletype-writer unit 9 to printout the attempt and overflow information.

Figure 2:
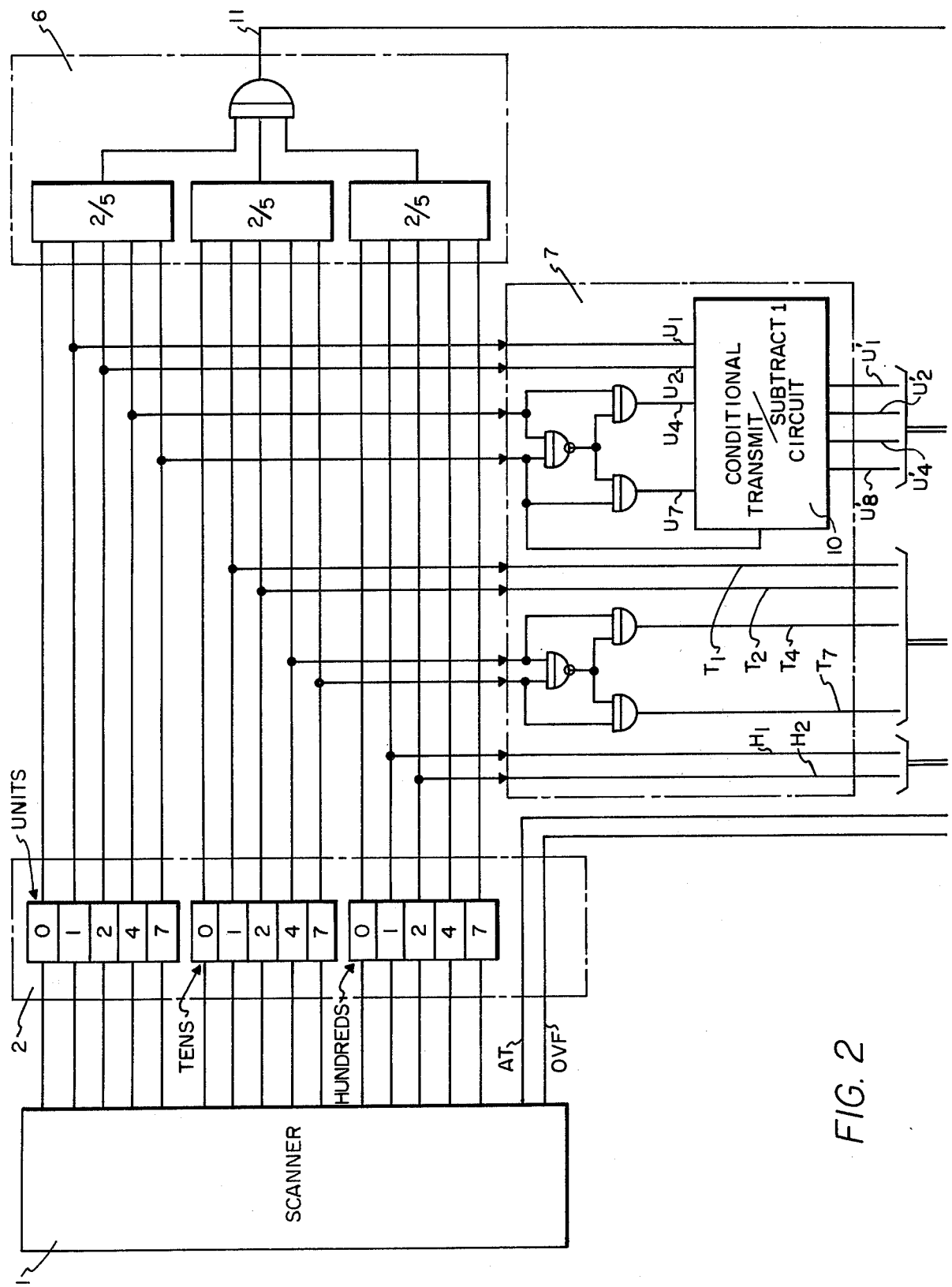
FIGS. 2, 3 and 4, when arranged as illustrated in FIG. 5, illustrate the trunk usage recording system in greater detail than that disclosed in block diagram of FIG. 1.
Figures 3, 5:
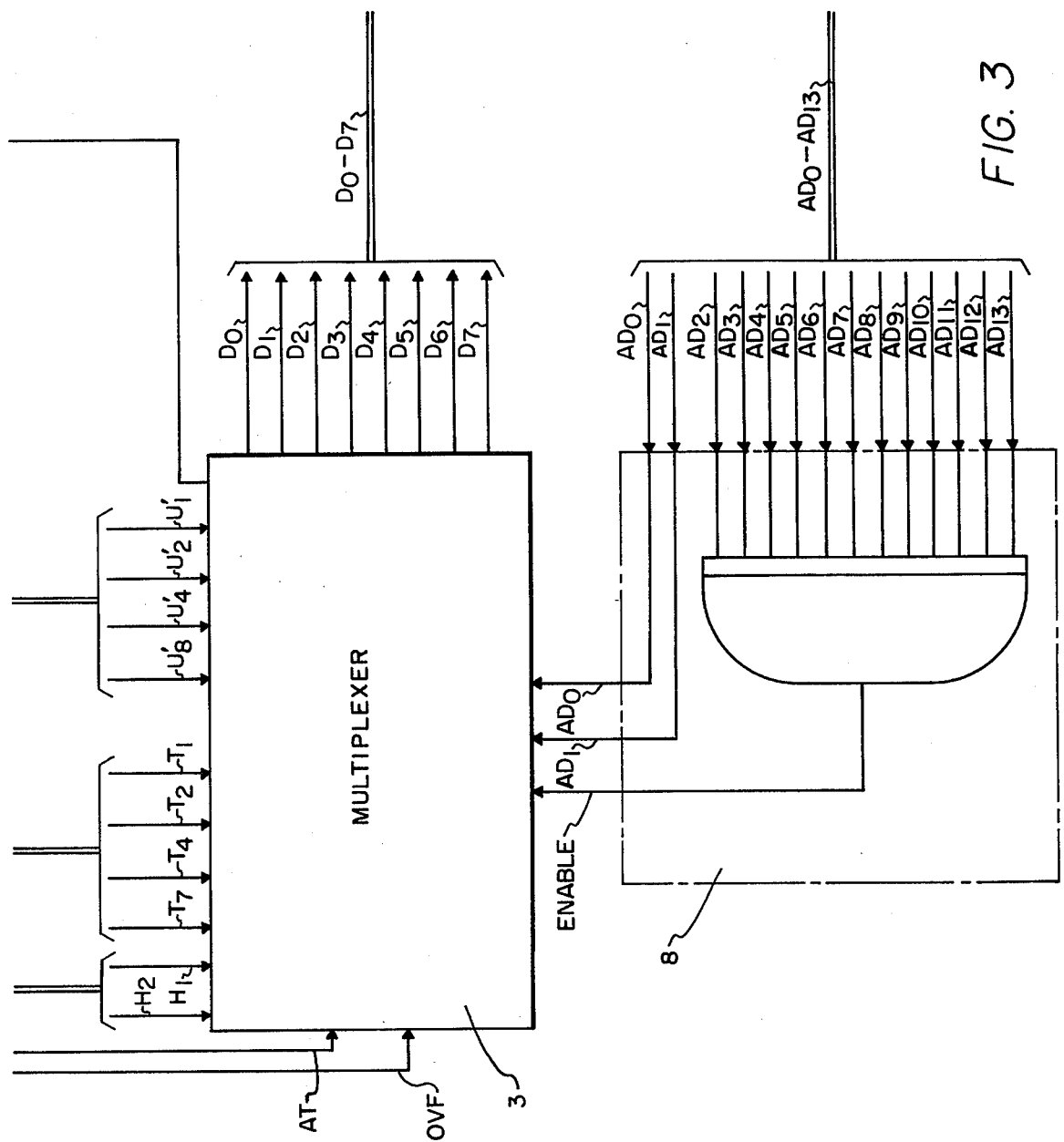

At this point a detailed description of the operation will be given and your attention is directed to FIGS. 2, 3 and 4 which should be oriented in the manner illustrated in FIG. 5. To start the description of the operation, it will be assumed that micro-processor 4 is operating, but that no attempt or overflow information is being input at this time. Micro-processor 4 is continuously scanning the output of multiplexer 3 and reading the first word, or address AD+0, as illustrated in FIG. 6. Micro-processor 4 examines bits $D_7$ and $D_6$ to determine if an attempt or overflow has been registered and hence whether it is necessary to increment the appropriate counters in memory 5. If no attempt or overflow is found, micro-processor 4 will continue functioning and perform other tasks such as printouts, for example. When the micro-processor 4 sees an attempt or overflow, it needs to obtain the trunk group identity in binary to be able to use that as an address to store the attempt or overflow information in the proper memory location. Since the output from the scanner 1, and hence the input to the system is in 2-out-of-5 code some conversion is necessary. The system takes advantage of the characteristics of micro-processor 4 and provides the code conversion in a most efficient manner. Micro-processor 4 includes instructions which permit addition of the contents of the specified memory location to the accumulator. By providing code conversion as illustrated in code conversion unit 7, the total number of words required to be multiplexed to micro-processor 4 is reduced. Code conversion unit 7 does not affect the bits coming from the hundreds digits. The bits from the tens digit are converted to a weighted 7-4-2-1 code. FIG. 8 illustrates the relationships between the 7-4-2-1-0 representation, the weighted 7-4-2-1 representation and the weighted 8-4-2-1 representation. The units digit is first converted into the weighted 7-4-2-1 code, then by conditionally subtracting 1 if the number is greater than 7, the units digit is converted into the weighted 8-4-2-1 representation illustrated in FIG. 8. The subtract 1 is accomplished by conditional transmit/subtract 1 circuit 10 in code conversion unit 7 which can be implemented by conventional logic. The bits from code conversion unit 7 are multiplexed by multiplexer 3 to micro-processor 4 in a number of words illustrated in FIG. 6. This pattern is strategically chosen to represent the binary value of each signal. For example, the signal T1 represents a total weight of 10 which is provided in binary by making the bits D3 and D1 conditional on T1. This process is repeated for the other signals as illustrated in FIG. 6.

If the units, tens or hundreds digits have either more or less than 2 digits in their output, 2-out-of-5 bit checker 6 will signal multiplexer 3 via lead 11 to zero all the bits except the attempt and overflow.

Returning to the explanation of the operational sequence, if micro-processor 4 has determined that there has been an attempt or overflow, it will store the attempt or overflow in temporary storage, and clear $D_7$ and $D_6$ from the received word. Thus the modified received word will contain the binary representation of the units digit. Micro-processor 4 will then address multiplexer 3, which will transmit the AD+1, AD+2 and AD+3 words to microprocessor 4. The AD+1, AD+2 and AD+3 words are then added sequentially to the AD+0 word. The final computed result will provide the trunk group identify in binary. Micro-processor 4 will use this address to determine the location of the appropriate counter in memory unit 5 and increment the attempt counter. Micro-processor 4 will also examine if there was an overflow indication. Should this be the case, it will increment the corresponding overflow counter also. Periodically micro-processor 4 will format this information and initiate a printout on teletypewriter 9 to indicate the attempt and overflow occurrences, for the trunk group.

The traffic analysis system of the present invention has now completed a full cycle of operation. Once the system has incremented the appropriate counters in memory 5 for an attempt or overflow, it will resume scanning the output of multiplexer 3 to determine if there has been another attempt or overflow on other trunk groups. The processing of an attempt or overflow indication on a trunk group, occurs at such a speed that the appropriate counter in memory 5 is incremented before scanner 1 will have time to supply the trunk identity for a different attempt or overflow on the scanned trunk groups.

What is claimed is:
1. In a telephone system having a plurality of trunks divided into trunk groups and a scanner for providing information on call attempts made on each trunk group, a trunk usage recording system comprising:
 a multiplexer;
 means for coupling the output of said scanner to said multiplexer;
 memory means for storing said call attempt information and system operating instructions; and
 a processor operatively coupled to said multiplexer and said memory means, said multiplexer receiving N inputs from said scanner and formatting the data received from said scanner into a plurality of data groups each having M outputs, where M is less than N, said processor being responsive to instructions from said memory means to read the output from said multiplexer and upon receipt of a call attempt indication from said multiplexer, converting said call attempt indication into an address for incre- menting said memory means.

2. The trunk usage recording system as claimed in claim 1 wherein the output of said scanner for trunk identification is in 2-out-of-5 bit code.

3. The trunk usage recording system as claimed in claim 2 wherein said coupling means includes a code converter for converting said 2-out-of-5 bit code into a hybrid code.

4. The trunk usage recording system as claimed in claim 1 wherein said coupling means includes a buffer register.

5. The trunk usage recording system as claimed in claim 2 including a 2-out-of-5 bit code checker.

6. The trunk usage recording system as claimed in claim 1 including a logic unit coupled between said micro-processor and said multiplexer, said logic unit converting addresses from said micro-processor into addresses to said multiplexer for indicating the output word requested from said multiplexer.

7. The trunk usage recording system as claimed in claim 1 including an output device coupled to said micro-processor.

* * * * *